United States Patent [19]

Morrill

[11] Patent Number: 5,157,292

[45] Date of Patent: Oct. 20, 1992

[54] ROTOR ASSEMBLY METHOD AND ARTICLE

[76] Inventor: Giles W. Morrill, Rocky Fork, Erwin, Tenn. 37650

[21] Appl. No.: 742,446

[22] Filed: Aug. 5, 1991

Related U.S. Application Data

[63] Continuation of Ser. No. 438,860, Nov. 17, 1989, abandoned, which is a continuation of Ser. No. 703,045, Feb. 19, 1985, abandoned.

[51] Int. Cl.⁵ .......................................... H02K 15/00
[52] U.S. Cl. ...................................... 310/42; 310/211; 310/261; 29/598
[58] Field of Search ................ 310/40 MM, 211, 90, 310/261, 89, 42, 254; 384/135, 136, 398, 412; 29/598

[56] References Cited

U.S. PATENT DOCUMENTS

| | | |
|---|---|---|
| Re. 24,909 | 12/1960 | Dochterman . |
| 526,686 | 10/1894 | Clark . |
| 2,053,425 | 9/1936 | Else . |
| 2,067,155 | 1/1937 | Levy et al. . |
| 2,306,743 | 12/1942 | Morrill . |
| 2,501,814 | 3/1950 | Gillen . |
| 2,522,941 | 9/1950 | Gillen . |
| 2,522,985 | 9/1950 | Bradley . |
| 2,571,672 | 10/1951 | Bradley . |
| 2,659,831 | 11/1953 | Lautner . |
| 2,685,658 | 8/1954 | Feiertag . |
| 2,904,709 | 9/1959 | Lautner . |
| 3,111,743 | 11/1963 | Ernst . |
| 3,165,816 | 1/1965 | Thompson et al. . |
| 3,293,729 | 12/1966 | Morrill . |
| 3,304,448 | 2/1967 | Lindt ................................ 310/71 |
| 3,420,335 | 1/1969 | Dochterman . |
| 3,755,889 | 9/1973 | Busian . |
| 3,874,073 | 4/1975 | Dochterman . |
| 4,045,698 | 8/1977 | Morrill . |
| 4,209,722 | 6/1980 | Peachee, Jr. . |
| 4,430,590 | 2/1984 | Davis . |
| 4,499,661 | 2/1985 | Peachee, Jr. . |
| 4,565,937 | 1/1986 | Uhen . |
| 4,947,539 | 8/1990 | Aussieker et al. ............ 310/42 UX |

Primary Examiner—R. Skudy
Attorney, Agent, or Firm—George Pappas

[57] ABSTRACT

A small rotor assembly for an alternating current motor and method of assembly are disclosed. The rotor assembly includes a squirrel cage winding which is die-cast onto a rotor subassembly of a shaft, a hollow, elongated hub, and a stack of rotor laminations. This squirrel cage winding does double duty of providing a short-circuited winding for the rotor and a unifying and rigidifying portion along a considerable length of the shaft for the rotor assembly in a unit-bearing motor. The single bearing of the unit-bearing motor extends inside the elongated hub, and the considerable length of die-cast sleeve along the shaft assures a rigid rotor assembly structure which permits the journal portion of the shaft to be very nearly perfectly concentric with the outside diameter of the rotor lamination. The result is considerably less eccentricity than in the prior art, resulting in a smaller air gap and a more efficient motor.

10 Claims, 2 Drawing Sheets

ROTOR ASSEMBLY METHOD AND ARTICLE

This is a continuation of application Ser. No. 07/438,860, filed Nov. 17, 1989, which in turn is a continuation of application Ser. No. 06/703,045, filed Feb. 19, 1985, both now abandoned.

BACKGROUND OF THE INVENTION

This invention relates to electric motor construction, and more particularly subfractional horsepower alternating current motors. Many such motors are constructed with two bearings in the frame or stator for journaling the rotor shaft near each end thereof. The present invention is concerned with a single or unit bearing motor wherein there is only one fixed bearing which journals a single journal portion on the rotor shaft. Motors of this type are shown in U.S. Pat. Nos. 3,293,729 and 4,045,698. Different methods have been proposed for assembling these small motors, and the former patent suggested an assembly method which included forming a laminated pole piece member of at least two superposed, thin laminations. U.S. Pat. No. 3,165,816 showed motors with two bearings, and also showed a motor with a single bearing. In that single bearing motor, it was proposed to use shims to space the rotor and stator, and then to use a settable adhesive to hold the bearings in alignment. U.S. Pat. No. 3,755,889 showed another unit bearing motor wherein a plurality of shims between the rotor and stator were used for alignment.

In the typical motor with two bearings, it is common in the smaller sizes of motors to have the rotor laminations with an aperture therein just the size of the shaft and to be secured directly to the shaft. In a unit bearing motor, in order to avoid a long overhang of the mounting of the rotor, it has been common to utilize a hollow sleeve-type of hub, with the hub secured at one end to the shaft and a large diameter portion of the hub carrying the stack of rotor laminations. Then a fixed bearing may extend inside the rotatable sleeve portion of the hub and be a bearing for a journal portion on the shaft so that the journal portion of the shaft longitudinally is substantially centered in the lamination stack. This eliminates the long overhang of the center of gravity of the rotor relative to the journal portion of the unit bearing. However, this means that the rotor laminations must have a large diameter aperture therein for mounting on this sleeve portion of the enlarged hub. It also introduces another manufactured item, the hub, with its attendant tolerances of inside diameter receiving the shaft and outside diameter receiving the lamination stack. This increases the chances of eccentricity of the rotor relative to the stator and, accordingly, the air gap must be made large enough to take care of such potential eccentricity in a series of manufactured motors.

For many years, an assembly method used in unit bearing motors has been to assemble the shaft with an aluminum hub, and then to machine the hub to be concentric with the shaft within a satisfactory limit. Next, the stack of rotor laminations which formed the core was die-cast separately to have mounted therein the squirrel-cage winding. This subassembly was then pressed onto the machined hub. Next, the outside diameter of the rotor lamination stack was ground to be concentric with the shaft within satisfactory limits.

A second method of assembling unit bearing motors has been practiced for a number of years, and this included extruding an aluminum or brass hub and then stacking the rotor laminations on this hub. This hub and lamination stack was then placed in a die casting machine and the squirrel cage winding die-cast onto the lamination stack. As a part of this die casting, a core pin had to be used to close the central aperture in the hub which would later receive the shaft. Next, after removal from the die casting machine, a fluted shaft was pressed into the aluminum or brass hub and secured, for example, by some anaerobic adhesive. Then, the outer diameter of the lamination stack was turned to be concentric with the shaft within satisfactory concentricity limits.

In both of these two prior art methods of rotor assembly, a number of steps were required. In the first of the two methods mentioned above, the assembly method was too labor-intensive and consisted of too many steps to be adequately competitive in the present marketplace. In the second of the two above-described methods, it was quite difficult to obtain adequate concentricity because of the imprecision of the press-fit of the shaft with flutes thereon into the small aperture of the hub. Also, with the squirrel-cage die casting being performed prior to the shaft being in place in the hub, there was no extra rigidity imparted to the entire rotor assembly by the die casting, and it was typical to have 0.003 inch eccentricity of the rotor O.D of 1.5 to 2 inches, for example. Because of this large eccentricity compared with the size of the motor, it was typical to have an air gap between the rotor and stator of 0.012 inch to make certain that the rotor would not rub on the stator, especially if the bearing started to wear. Actually, the bearing did wear out much more quickly because of the dynamic unbalance due to the eccentricity of the rotor.

The General Electric Company has had a long history of unit bearing motors since the U.S. Pat. No. 526,686 to Clark of 1894. This showed a rotating shaft in a commutator-type motor. The Morrill U.S. Pat. No. 2,306,743 showed an induction-type motor with a unit bearing but with some cantilever overhang on the rotor relative to the unit bearing. The Bradley U.S. Pat. No. 2,522,985, filed Dec. 29, 1945, also showed an induction motor, again with some overhang of the rotor relative to the unit bearing and with the squirrel cage cast onto a separate sleeve which was splined to the rotating shaft. This is generally the construction used on small unit bearing motors by General Electric in production to this day.

The Bradley U.S. Pat. No. 2,571,672 followed the design of the previous patent but extended the unit bearing deeper into the rotor so that there was less cantilever overhang relative to the bearing. The Feiertag U.S. Pat. No. 2,685,658 was another suggested General Electric design of a unit bearing motor but again had considerable overhang of the rotor relative to the unit bearing. The Dochterman U.S. Pat. No. 2,782,720 and the reissue 24,909 thereof showed a unit bearing motor in a fixed shaft configuration. The Thompson et al. U.S. Pat. No. 3,165,816 showed two-bearing motors and also a unit bearing motor in FIG. 11 again with the squirrel cage cast onto a separate sleeve splined to the shaft. The Dochterman U.S. Pat. No. 3,420,335 again showed the typical General Electric construction of the squirrel cage cast onto a sleeve splined to the rotating shaft. The Busian U.S. Pat. No. 3,755,889 showed a unit bearing motor but gave no details of the rotor construction, that invention being directed to assembling by use of shims. The Dochterman U.S. Pat. No. 3,874,073, similar to Busian, did not show the details of the rotor construction. Instead, the invention was directed to removing heat from the stator. The Uhen U.S. Pat. No. 4,565,937 again showed the typical General Electric construction of the squirrel cage cast onto a sleeve which was splined to the rotating shaft of a unit bearing motor.

Others of the prior art have suggested unit bearing motors, and these include the Else U.S. Pat. No. 253,425 assigned to Westinghouse Electric & Manufacturing Company. This patent suggested a construction of oil flow along the shaft and return to a reservoir. The Levy et al. U.S. Pat. No. 2,067,155 assigned to General Motors Corporation showed a unit bearing induction motor with the squirrel cage extended to drive a fan. The Gillen U.S. Pat. No. 2,501,814 showed a fixed shaft unit bearing motor with the output rotatable shaft connected to the rotor squirrel cage by a dome-shaped element. The Gillen U.S. Pat. No. 2,522,941 again showed a fixed shaft motor of the inside out construction. The Lautner U.S. Pat. No. 2,659,831, assigned to Knapp Monarch Company, showed a unit bearing motor with a considerable overhang of the rotor relative to the bearing. The Lautner U.S. Pat. No. 2,904,709, assigned to Howard Industries, Inc., showed a fixed shaft unit bearing motor. The Ernst U.S. Pat. No. 3,111,743 showed a fixed shaft motor with the output rotatable shaft connected to the squirrel cage conductor bars by a dome-shaped element. The Morrill U.S. Pat. No. 3,293,729 showed the rotor laminations mounted on a hub secured to the shaft. The Morrill U.S. Pat. No. 4,045,698 also showed the rotor laminations mounted on a hub secured to the shaft. The Peachee, Jr., U.S. Pat. No. 4,209,722 showed a unit bearing motor with the squirrel cage die cast onto a sleeve which was splined to the shaft. The Davis U.S. Pat. No. 4,430,590 showed a unit bearing motor with a fixed shaft. The Peachee, Jr., U.S. Pat. No. 4,499,661 showed a unit bearing motor with the squirrel cage and rotor laminations mounted on a hub which was splined to the shaft. These patents all showed constructions which were labor-intensive, which makes the motors costly to produce.

SUMMARY OF THE INVENTION

The problem to be solved, therefore, is how to assemble a small electric motor in a manner to minimize the labor component and at the same time to achieve a rotor which has a very high degree of concentricity.

This problem is solved in a unit bearing motor by providing a subassembly of shaft, lamination stack, and hub wherein the subassembly is die-cast as a single unit to create the squirrel-cage winding.

More specifically, the problem is solved by the method of making a rotor assembly for a subfractional horsepower alternating current motor comprising forming a shaft and finishing a journal portion thereon, forming a metal hub having a small inside diameter portion of a diameter to closely receive said shaft and having a large diameter portion of a diameter to closely receive a stack of rotor laminations, forming a subassembly of shaft, hub, and laminations including securing said small inside diameter portion of said hub to said shaft and securing said stack of rotor laminations on said large diameter portion of said hub, forming a squirrel cage winding through apertures in said stacked rotor laminations to make a rotor assembly, and centering said rotor assembly by means of the journal portion of said shaft and machining the outside diameter of said stack of laminations to make them concentric with the shaft within a close tolerance.

The problem is further solved by an electric motor, comprising, in combination, a stator, a fixed unit bearing post fixedly mounted in said stator, a rotatable shaft having first and second ends with a journal portion near said second end journalled in said fixed unit bearing post, said first end of said shaft extending out of said fixed unit bearing post in a cantilever manner, a stack of rotor laminations, a die cast squirrel cage winding on and in said rotor lamination stack, and a first annular sleeve unitary with said squirrel cage winding and having a portion intimately contacting said shaft near said first end to rigidly hold said shaft relative to said rotor lamination stack for a minimum air gap with said stator.

Accordingly, an object of the invention is to provide a unit bearing motor wherein the rotor is held concentric with the stator within very close limits.

Another object of the invention is to provide a unit bearing motor wherein the squirrel cage winding aids in rigidifying the rotor assembly to assure close tolerance of concentricity of the rotor and stator at initial manufacture and throughout its running life.

A still further object of the invention is to provide a rotor assembly wherein the squirrel cage winding embraces a part of the rotor shaft to achieve a long contact area to make a rigid rotor assembly and achieve a high degree of concentricity of the rotor and lamination stack, thus permitting a smaller-than-usual air gap between the rotor and the stator.

Other objects and a fuller understanding of the invention may be had by referring to the following description and claims, taken in conjunction with the accompanying drawing.

DESCRIPTION OF THE PREFERRED EMBODIMENT

Figure 7:
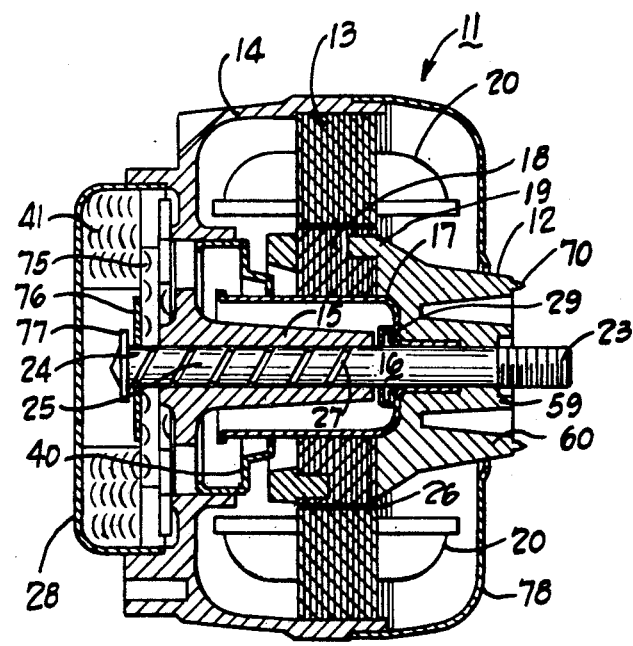
FIG. 7 is a longitudinal, sectional view of the completed rotor assembly in a unit bearing motor.

FIG. 7 shows a completed unit bearing motor 11 in which the rotor assembly 12 is journaled. The motor 11 includes a magnetically permeable stator formed from a stack of stator laminations 13. A frame 14 is provided in the preferred embodiment in which to mount the stator laminations 13 and to be integral with a single bearing 15. The rotor assembly 12 includes generally a shaft 16, a hub 17, a rotor lamination stack 18, and a squirrel cage winding 19.

The stator laminations 13 have stator windings 20 to provide an alternating current energization to the motor 11. Means to start the motor may be provided, either a split phase winding or shading coils (not shown). The rotor assembly 12 is one integrated unit so that the shaft 16 has a first end 23 and a second end 24 with a journal portion 25 near this second end 24. The journal portion is elongated and is closely journaled within the bearing 15 so that this single bearing may support the rotor assembly 12 for a minimum of eccentricity of the rotor 12. This permits a minimum amount of air gap 26 at the outside diameter of the rotor laminations relative to the stator laminations 13. Means is provided for lubrication of the shaft journal portion 25 within the bearing 15. This may be provided in a number of ways, e.g., a lubricated porous bearing, but in the preferred embodiment, positive movement of a fluid lubricant such as lubricating oil is provided by a helical oil groove 27 formed in the journal portion 25 of the shaft 16. This groove is spiraled in a direction so that upon unidirectional rotation of the motor, the groove distributes lubricant from a lubricant reservoir 28 throughout the bearing to a thrust washer 29 which is freely rotating on the shaft 16.

Figure 2:
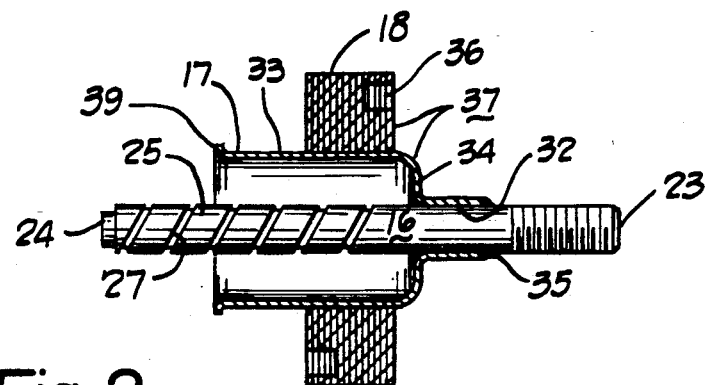
FIG. 2 is a longitudinal, sectional view of a subassembly of a shaft, hub, and rotor lamination stack.

The hub 17 is better shown in FIG. 2, and in the preferred embodiment is a drawn steel hub having a small inside diameter portion 32 and a large outside diameter portion 33 joined by a generally radial wall 34. This radial wall is that abutted by the thrust washer 29 (FIG. 7) and the metal hub 17 (FIG. 7) is formed to close limits during its plural drawing stages so that the small inside diameter portion 32 will be very closely received on the shaft 16 near the first end 23. This is to obtain a good degree of concentricity between the shaft 16 and the large outside diameter portion 33 of this hub 17. This large outside diameter portion 33 is also sized carefully during the drawing stages so that the rotor lamination stack 18 will have a press fit thereon to secure these rotor laminations on the hub. The interconnection between the hub small inside portion 32 and the shaft 16 is made oil-tight so that lubricant will not be lost during the long life of the motor. This may be accomplished in many ways, e.g., an anaerobic sealant, or soldering or brazing. In the preferred embodiment, the two pieces are welded together at 35; namely, at the very end of the hub.

FIG. 2 also shows the rotor lamination stack 18 press-fitted onto the large outside diameter portion 33 of the hub 17. This lamination stack may be of a variable length along the hub in order to accommodate different power output requirements of the motor 11. The lamination stack 18 is provided with rotor slots 36 which are skewed in accordance with usual practice. This combination of shaft 16, hub 17, and rotor lamination stack 18 forms a rotor subassembly 37. The hub 17, in this preferred embodiment, has an oil slinger flange 39. In the assembled motor shown in FIG. 7, this oil slinger flange is disposed inside an annular chamber 40 which communicates with the lubricant reservoir 28 to return lubricant migrating along the inside of the large outside diameter portion 33 to this reservoir 28. The reservoir may contain felt or like material 41 to retain the oil lubricant and to wick it to the second end 24 of the shaft 16.

In this preferred embodiment shown, the lubricant reservoir is large and has positive flow of lubricant by the oil groove 27 so that the motor will have a long life. A typical use for such a small motor is to drive a fan in a refrigeration or food cooler environment. In such case, the motor may run 18 hours per day, 365 days per year, and for 10 or 20 years, all without relubrication. The load to be driven by the motor may be connected to the second end 24 of the shaft 16, especially if this end of the shaft is extended out through the lubricant reservoir 28, e.g., for connection to a pump. In the embodiment shown in FIG. 7, the first end 23 of the shaft 16 is threaded to receive a nut for securing a load, such as a fan blade, in place on the shaft.

Figure 1:
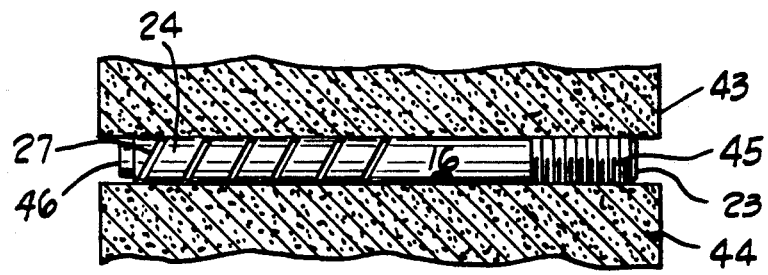
FIG. 1 is a longitudinal, sectional view of centerless grinding of a shaft.

The rotor assembly 12 may be made with simplicity and with a minimum of hours of labor. The shaft 16 is manufactured to close tolerances, with a high degree of cylindricity. This may be accomplished by roll burnishing, as in roller bearings, or in the preferred embodiment, is performed by centerless grinding by grinding wheels 43 and 44 shown diagrammatically in FIG. 1. Prior to grinding, the oil groove 27 has been formed and threads 45 formed on the first end 23 of the shaft 16. Also, a small diameter extension 46 has been formed on the second end 24 of the shaft.

FIG. 2 shows the next step in the assembly, namely, the formation of the rotor subassembly 37. It does not matter whether the shaft and hub are first assembled or the hub and rotor lamination stack are first assembled, or even that all three components are assembled simultaneously. What is important is that the rotor subassembly 37 is assembled as shown in FIG. 2 prior to the formation of the squirrel cage winding 19. In one preferred method of assembly, the shaft 16 is press-fitted into the small inside diameter portion 32 of the hub 17 and then welded at 35 to form a rigid assembly of these two parts which is oil-tight.

Next, the stack of rotor laminations 18 is press-fitted onto the large outside diameter portion 33 with the rotor laminations in such a position that the rotor slots 36 are skewed, per usual practice. These rotor slots may be open, closed, or partially closed, as desired, for the desired motor operating characteristics.

This rotor subassembly 37 is next provided with a die-cast squirrel cage winding 19 which has the dual function of providing the secondary winding on the rotor and also rigidifying the rotor assembly 12, and makes an integrated unit which may later be established as very nearly perfectly concentric with the bore in the stator laminations 13.

Figure 3:
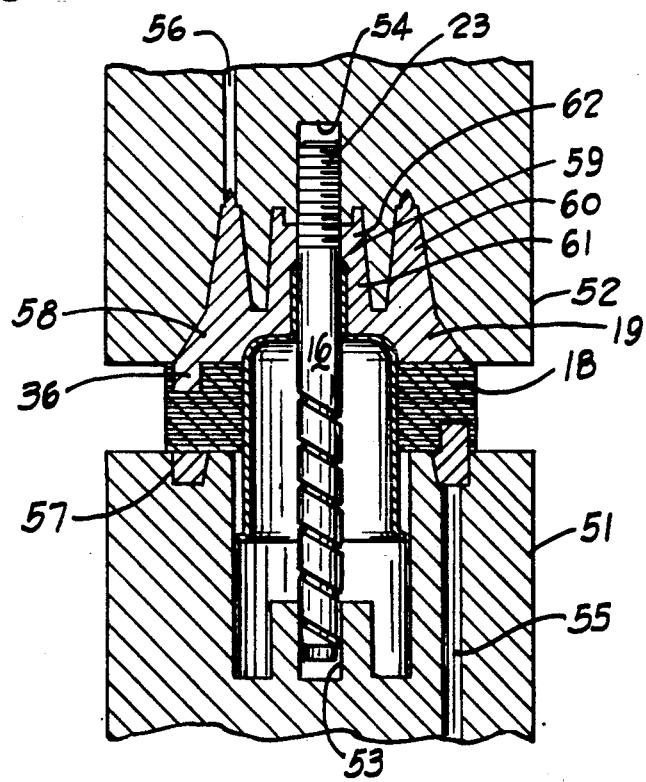
FIG. 3 is a longitudinal, sectional view of the die casting of a squirrel cage onto a rotor subassembly.

FIG. 3 shows diagrammatically a die-casting machine. This die-casting machine has die-casting dies 51 and 52 which compress the stator lamination stack and also embrace it, if necessary, in case the rotor slots are open or partially closed. The dies 51 and 52 have central apertures 53 and 54, respectively, to receive the ends of the shaft 16, the die 51 having one or more sprues 55, and the die 52 having one or more vents 56. The dies 51 and 52 also have the necessary shape to form the exterior shape of the squirrel cage winding 19. This winding, of course, fills the rotor slots 36 and forms continuous end rings 57 and 58. In addition, first and second annular or substantially cylindrical concentric sleeves 59 and 60 are unitarily formed near the first end 23 of the shaft 16. The first cylindrical sleeve 59 is the smaller of the two sleeves and is an annular section (as shown in FIG. 7) immediately surrounding the shaft 16. This sleeve 59 has a first and a second portion with the first portion 61 surrounding and intimately embracing the small inside diameter portion 32 of the hub 17. The second portion 62 of the sleeve 59 is closer to the first end 23 of the shaft 16 and surrounds and is in intimate contact with this shaft 16. In the preferred embodiment, the second portion 62 of sleeve 59 is at least about fifty percent of the length of the first portion 61 of this sleeve. This second portion 62 contacts the shaft in all principal radial directions to rigidly hold the rotor lamination stack 18 for a minimum air gap 26 with the stator laminations 13.

Figure 4:
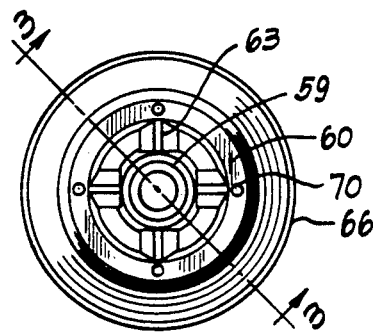
FIG. 4 is an elevational view of a first end of the rotor assembly.

The second substantially cylindrical sleeve 60 surrounds and is concentric with, and spaced from, the first cylindrical sleeve 59. As best shown in FIG. 4, there are a plurality of substantially radial ribs 63 which unitarily extend between the first and second sleeves 59 and 60. The large diameter of this second sleeve 60 and the radial ribs 63 unify the squirrel cage winding 19 near the first end 23 of the shaft 16. This makes the entire squirrel cage winding a relatively large mass, considering the small size of the motor 11, so that the rotor assembly 12 is one which is quite rigid and stable.

Figure 6:
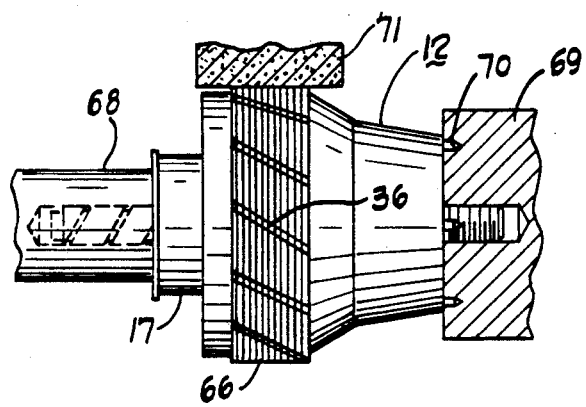
FIG. 6 is a side elevational view of the completed rotor assembly being ground on its outside diameter.

Next, the outside diameter 66 of the rotor lamination stack 18 is prepared so that it is concentric with the shaft 16 within a very close tolerance. This may be by machining, as with a lathe-type tool, but in the preferred embodiment of this invention, it is by grinding as shown in FIG. 6. FIG. 6 shows, rather diagrammatically, a bearing hub 68 which temporarily rotatably supports the journal portion 25 of the shaft 16. A concentric driver 69 is provided to engage and rotate the rotor assembly 12. The rotor assembly 12 may be provided with drive lugs 70 on the end of the die-cast squirrel cage winding 19, which lugs 70 will ultimately be used to engage apertures in the fan blade or other load driven by the motor 11. This concentric driver 69 may have apertures to engage the drive lugs for positive drive of the rotor assembly 12. With this rotation, then a grinding wheel 71 is preferably used to finish the outside diameter 66 so that it is very nearly perfectly concentric with the shaft journal portion 25. Because the rotor assembly 12 is so rigid and so well-secured between the shaft 16, hub and squirrel cage winding 19, it has been observed that the concentricity may be maintained five times, or even ten times, as great as before. Specifically, the concentricity of shaft and rotor outside diameter may be achieved consecutively in mass production within 0.003 inch or less, and even 0.0005 inch total indicator reading can be achieved. With this nearly perfect concentricity, the amount of eccentricity is extremely small, and hence the dynamic unbalance during running does not establish any appreciable wear on the bearing 15. This is in contradistinction to the first method of the prior art recited above, wherein the amount of eccentricity was sufficient to cause considerable dynamic unbalance, which could relatively quickly wear out the bearing. In the present invention, the amount of eccentricity is sufficiently small that there is always maintained a film of lubrication between the bearing and the shaft journal portion so that there is no measurable wear on the bearing.

More importantly, the rigidity and unity of the motor assembly 12 permit this nearly perfect concentricity to be maintained throughout the normal service life of the motor, namely ten to twenty years. As a result, the air gap 26 may be made considerably smaller than has been the usual practice in the industry. The usual practice for this size rotor, namely, a rotor diameter of 1.75 inches, has been about a minimum of 0.010 inch. Now, with this improved rotor assembly 12, it is entirely feasible in consecutively manufactured units to provide an air gap of only 0.008 inch. This improves the efficiency by about 20 percent. As an example, a motor with 15-watt input may now be made with only a 12-watt input for the same power output. This permits saving of iron laminations or copper windings, or both, because of greater efficiency.

Figure 5:
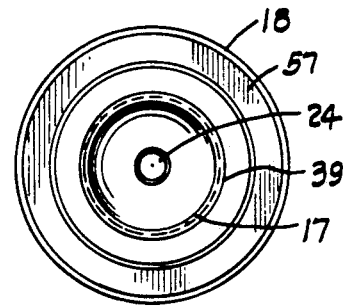
FIG. 5 is an elevational view of the second end of the rotor assembly.

FIG. 5 shows the second end of the motor with the end ring 57 and the second shaft end 24.

FIG. 7 shows the completed rotor assembly 12 assembled in the unit bearing motor 11. The rotor assembly 12 is inserted into the stator from the right end, as viewed in FIG. 7, and then the annular oil wick 75 mounted and a thrust plate 76 secured in any suitable manner fixed relative to the frame 14.

Next, a thrust washer 77 is secured on the second end 24 of the shaft in any suitable manner. In the preferred embodiment, the shaft extension 46 is headed over like a rivet to secure this thrust washer in place. The lubricant reservoir 28, with its felt 41 and lubricant, may be pressed into and sealed in the frame 14 and a protective shell 78 pressed over the other end of the frame 14 for cosmetic reasons and for protection to the front end of the motor 11.

The resultant motor 11 is one which has a very long life and one which has a very minimum of eccentricity of the rotor outside diameter relative to the stator inside diameter, and hence the air gap 26 may be made a minimum for high efficiency of the motor. The rotor assembly 12 is one which is initially rigid upon manufacture and stays rigid throughout the normal life. This is due to the extra long contact between the squirrel cage winding 19 and the shaft 16, as well as the hub small inside diameter portion 32. This small inside diameter portion may be extended so as to be the full length of the sleeve 59, or even foreshortened somewhat so that a greater portion of the sleeve 59 directly contacts and embraces the shaft 16. In either case, the long effective surface contact between the squirrel cage winding 19 and the shaft and hub components achieves a very rigid structure which will stay as nearly perfectly concentric with the shaft journal portion 25 as when manufactured.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric motor, comprising, in combination, a stator;

a fixed unit bearing post fixedly mounted in said stator;

a rotatable shaft having first and second ends with a journal portion near said second end journalled in said fixed unit bearing post;

said first end of said shaft extending out of said fixed unit bearing post in a cantilever manner;

a formed metal hub having small and large diameter portions;

a stack of rotor laminations assembled around said large diameter hub portion;

the small diameter portion of said hub being in assembled contact with said shaft near said first end;

means securing and sealing said small diameter portion of said hub to said shaft in an oil tight manner; and a single unitary die cast element forming a squirrel cage winding and a first annular sleeve, said first sleeve formed near said end of said shaft and immediately surrounding said shaft, said first annular sleeve further having a first portion surrounding and intimately embracing said small diameter portion of said hub having a second portion closer to said first end said shaft surrounding and being in intimate contact with said shaft, whereby said shaft, hub and rotor laminations are made stable and rigid by said formed single unitary die cast squirrel cage winding and first annular sleeve.

2. An electric motor as set forth in claim 1, wherein said hub is drawn steel hub.

3. An electric motor as set forth in claim 1, wherein said small diameter portion of said hub is secured to said shaft in an oil-tight manner.

4. An electric motor as set forth in claim 1, wherein said stack of rotor laminations is press-fitted onto said large diameter portion of said hub.

5. An electric motor as set forth in claim 1, wherein outside diameter of said stack of rotor laminations is ground concentrically with the shaft journal portion within 0.001 inch total indicator reading.

6. An electric motor as set forth in claim 1, including a spiral oil groove on said journal portion of said shaft.

7. An electric motor as set forth in claim 1, including a centerless ground journal portion on said shaft.

8. An electric motor as set forth in claim 2, including an enlarged oil slinger bell on the end of said large diameter portion of said hub.

9. An electric motor as set forth in claim 2, wherein said die cast element includes a second substantially cylindrical sleeve surrounding the first-mentioned sleeve and unitary joined thereto by substantially radial ribs for added rigidity of said shaft, hub and rotor lamination.

10. An electric motor as set forth in claim 1 wherein said second portion of said first annular sleeve is at least 50% of the longitudinal length of said first portion of said first sleeve.

* * * * *

UNITED STATES PATENT AND TRADEMARK OFFICE
CERTIFICATE OF CORRECTION

PATENT NO. : 5,157,292
DATED : October 20, 1992
INVENTOR(S) : Giles W. Morrill

It is certified that error appears in the above-identified patent and that said Letters Patent is hereby corrected as shown below:

Col. 10, line 13, change "unitary" to --unitarily--

On title page, item [54] and col. 1, line 1, change "ROTOR ASSEMBLY METHOD AND ARTICLE" to --ELECTRIC MOTOR WITH UNIT ROTOR ASSEMBLY--

Signed and Sealed this

Sixteenth Day of November, 1993

Attest:

BRUCE LEHMAN

Attesting Officer

Commissioner of Patents and Trademarks